(12) United States Patent
Blasinski

(10) Patent No.: US 9,716,614 B2
(45) Date of Patent: *Jul. 25, 2017

(54) INFRASTRUCTURE CORRELATION PROTOCOL

(71) Applicant: Verizon Patent and Licensing Inc., Arlington, VA (US)

(72) Inventor: Jeffrey John Blasinski, Dublin, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/162,419

(22) Filed: May 23, 2016

(65) Prior Publication Data

US 2016/0269221 A1  Sep. 15, 2016

Related U.S. Application Data

(63) Continuation of application No. 14/012,926, filed on Aug. 28, 2013, now Pat. No. 9,413,599.

(51) Int. Cl.
| | |
|---|---|
| *H04L 12/26* | (2006.01) |
| *H04L 12/24* | (2006.01) |
| *H04W 4/00* | (2009.01) |
| *H04W 4/02* | (2009.01) |

(52) U.S. Cl.
CPC ...... *H04L 41/0631* (2013.01); *H04L 43/0817* (2013.01); *H04W 4/005* (2013.01); *H04W 4/02* (2013.01)

(58) Field of Classification Search
CPC ....... G06F 11/30; G06F 2201/68; H04L 43/08
See application file for complete search history.

(56) References Cited

U.S. PATENT DOCUMENTS

| | | |
|---|---|---|
| 9,413,599 B2 * | 8/2016 | Blasinski ............ H04L 41/0631 |
| 2003/0092709 A1 | 5/2003 | Yoon et al. |
| 2003/0093709 A1 | 5/2003 | Ogawa et al. |
| 2006/0059253 A1 | 3/2006 | Goodman et al. |
| 2007/0008953 A1 | 1/2007 | Wing et al. |
| 2007/0240061 A1 | 10/2007 | Cormode et al. |
| 2009/0119243 A1 | 5/2009 | Yuan et al. |
| 2010/0312874 A1 | 12/2010 | Jansen et al. |
| 2011/0071963 A1 | 3/2011 | Piovesan et al. |
| 2013/0297259 A1 | 11/2013 | Tsao et al. |

* cited by examiner

*Primary Examiner* — Kevin C Harper

(57) ABSTRACT

The performance and/or state of communication infrastructure that transmits data may be correlated with the transmitted data. In one implementation, a method may include receiving infrastructure data relating to a state of communication infrastructure; receiving identifiers corresponding to machine to machine nodes that transmit data using the communication infrastructure; storing the infrastructure data to associate the infrastructure data to the identifiers corresponding to the nodes; generating structured data that represents a correlation of the received data and the infrastructure data; and providing at least a portion of the structured data, to one or more devices relating to the plurality of computing nodes or the communication infrastructure.

20 Claims, 10 Drawing Sheets

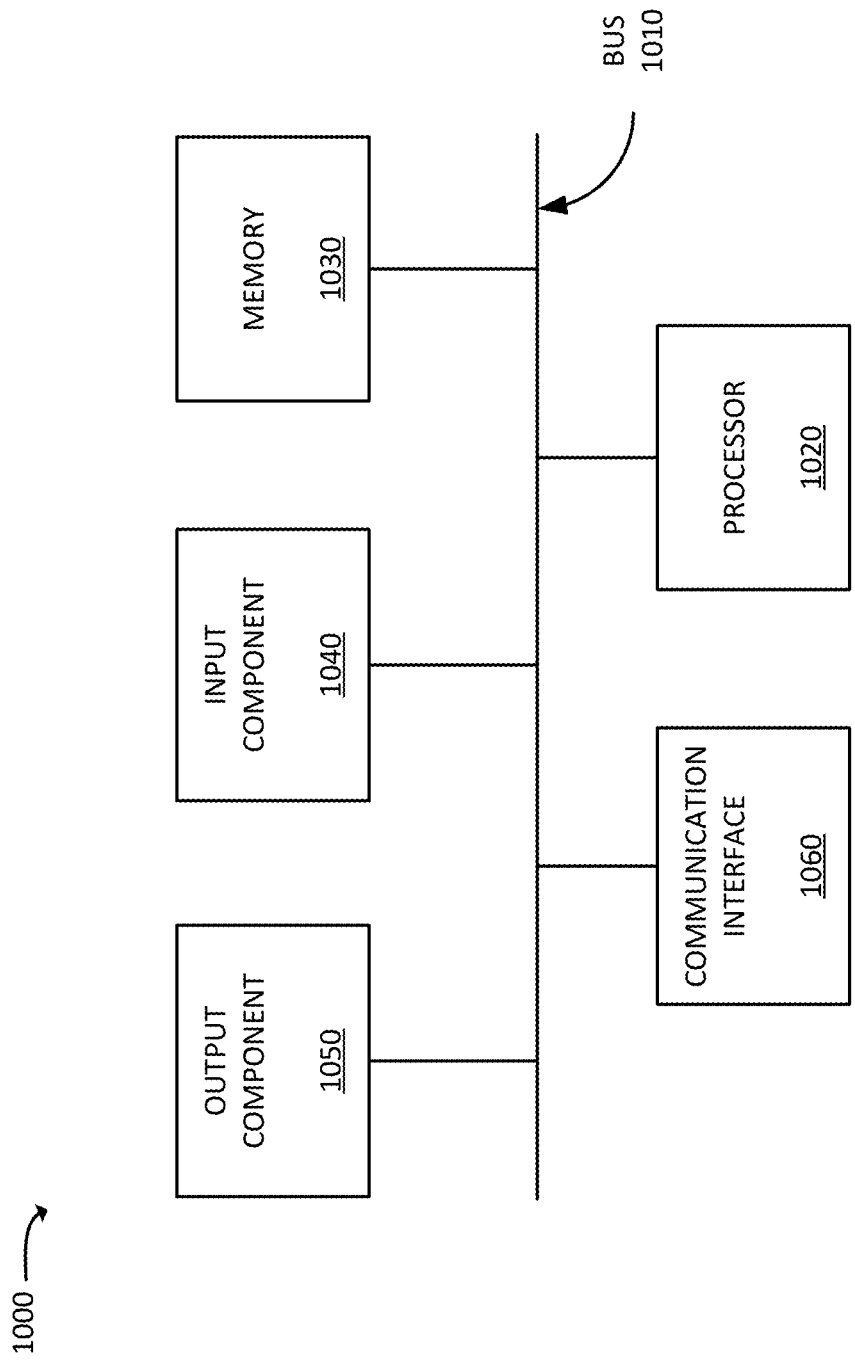

INFRASTRUCTURE CORRELATION PROTOCOL

CROSS-REFERENCE TO RELATED APPLICATION

This application is a continuation of co-pending U.S. patent application Ser. No. 14/012,926, titled "INFRASTRUCTURE CORRELATION PROTOCOL," filed Aug. 28, 2013, the contents of which are incorporated herein by reference in their entirety.

BACKGROUND

Machine to Machine (M2M) communications refer to technologies that allow devices, which may be referred to as nodes of an M2M network, to communicate with one another over wired or wireless networks. An M2M node may include a sensor, meter, or other device that captures an "event" (temperature, inventory level, etc.), which is relayed through a network (wireless, wired, or hybrid) to an application that translates the captured event into meaningful information (e.g., items need to be restocked).

Data from nodes in an M2M network (referred to as "M2M data" herein) may be received and analyzed at a central site (referred to as an "application server" herein). The "application server," as used herein, may refer to one or more server devices and or software components, which may be physically distributed or located at a single location. Typically, the application server, or users associated with the application server, may make decisions, such as business or process decisions, based on an analysis of the M2M data associated with some or all of the nodes in the M2M network. It can be important for the decision making process of the M2M network/application server that the data received by the application server is not corrupted, or otherwise adversely affected, during the transport of the data from the M2M nodes to the application server.

BRIEF DESCRIPTION OF THE DRAWINGS

FIG. 10 is a diagram of example components of a device.

DETAILED DESCRIPTION OF PREFERRED EMBODIMENTS

The following detailed description refers to the accompanying drawings. The same reference numbers in different drawings may identify the same or similar elements.

Techniques described herein may provide for an analysis of the performance of infrastructure, such as network infrastructure, that may transmit data. The transmitted data may correspond to M2M data, or more generally, to data transmitted by any computing device across network infrastructure. The analysis may include correlating the operation of the infrastructure with the data. Based on the analysis, actions may be taken and/or reports may be generated. The analysis may be provided as a service by an operator of the infrastructure.

Figure 1:
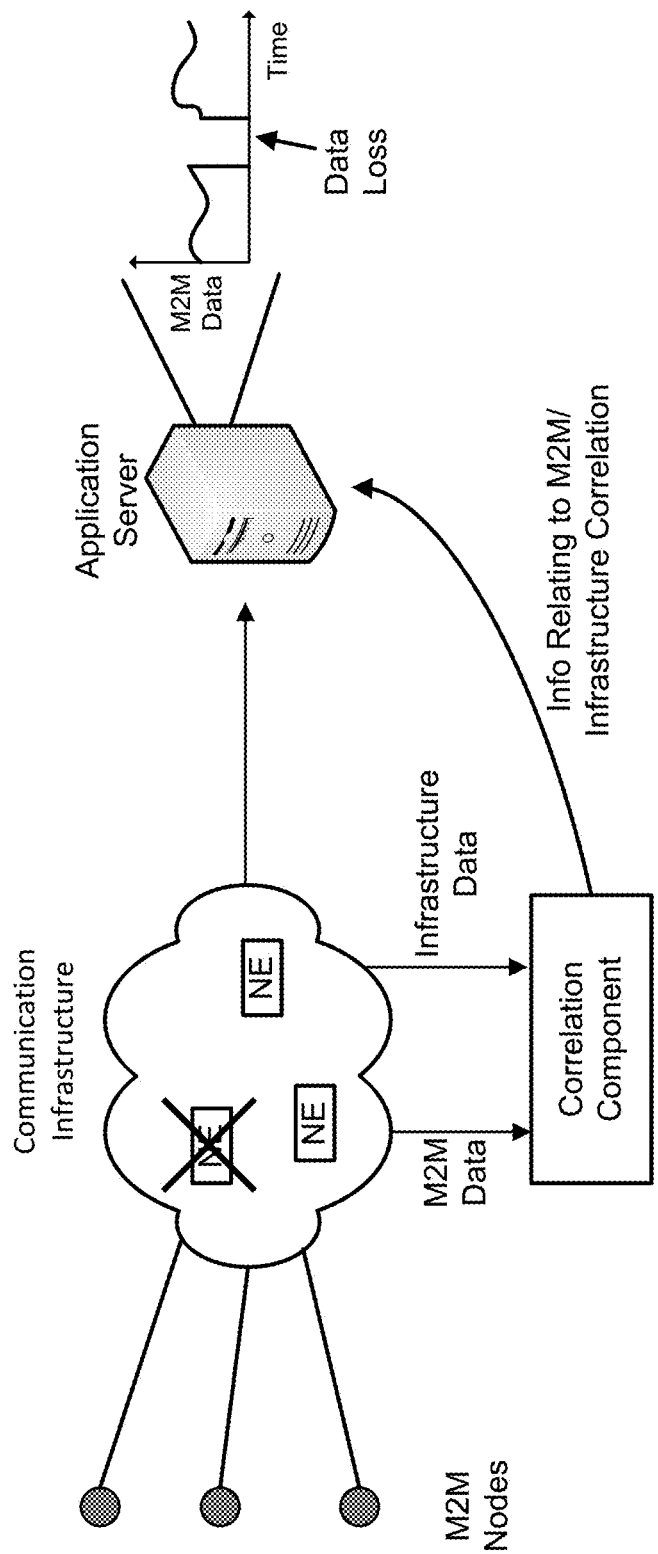
FIG. 1 is a diagram conceptually illustrating an example of an overview of concepts described herein.

FIG. 1 is a diagram conceptually illustrating an example of an overview of concepts described herein. The example of FIG. 1 will particularly be discussed in the context of an M2M network. As shown in FIG. 1, an M2M network may include a number of nodes, which are each illustrated in FIG. 1 as a circle, that transmit data to an application component over communication infrastructure. The communication infrastructure may include, for example, a wired and/or wireless network. A correlation component may receive the M2M data from the M2M nodes, as well as infrastructure data. The infrastructure data may include data describing the operation of the communication infrastructure. For example, the infrastructure data may include information on network latency, network bandwidth, network congestion, status of network elements that implement the communication infrastructure, etc. The correlation component may correlate the M2M data to the infrastructure data. For example, M2M data from a first M2M node may be transmitted through a first network path, and M2M data from a second M2M node may be transmitted through a second network path. The correlation component may associate infrastructure data, corresponding to the first network path, with the first M2M node. Similarly, the correlation component may associate infrastructure data, corresponding to the second network path, with the second M2M node.

Assume that an operator of the application component notices, or receives an alert regarding, a questionable data point in the M2M data received by the application component. As shown in FIG. 1, for example, a plot of M2M Application data versus time (e.g., a plot of sensed temperatures, sensed soil moisture levels, etc., versus time) may include a section in which the M2M data exhibits an abrupt drop off, which may indicate data loss. The operator of the application server may wish to investigate the source of the potential data loss. The operator may query the correlation component to view infrastructure data corresponding to the M2M data that exhibits the potential data loss. The operator may determine, for example, that a particular network element (NE) responsible for delivering the M2M data, corresponding to the data loss, may have been experienced an error over the time period corresponding to the data loss, or an individual reporting device may have gone offline for some reason.

In this manner, operators of the application server may be able to obtain infrastructure data relating to the M2M data received by the application server. Being able to obtain infrastructure data relating to M2M data may be useful in a number of scenarios, such as when diagnosing the cause of M2M data loss or corruption, or in viewing the robustness of the communication infrastructure over a particular time period. In general, if the M2M data is somehow corrupt, or data is missing and associated reasons for the data being missing are not understood, the application server may process the data verbatim, and undesirable results could occur. More specifically, data received by the application server should not be corrupted, should be received with awareness of the completeness of the data, and should not be otherwise adversely affected during the transport of the data from the M2M nodes to the application server. The definition of what adequately constitutes a complete data set may be desirable for the ability of the M2M system to function properly.

In some implementations, in addition to providing reports to the application server, the correlation component may perform actions based on the analysis of the infrastructure data and/or M2M data. For example, the correlation component may determine that particular data items, of the M2M data, may have been lost in transmission and may request that the corresponding M2M nodes retransmit the data. As another example, the correlation component may determine that a particular network section or network element is down, and may correspondingly instruct one or more M2M nodes to delay sending M2M data.

Figure 2:
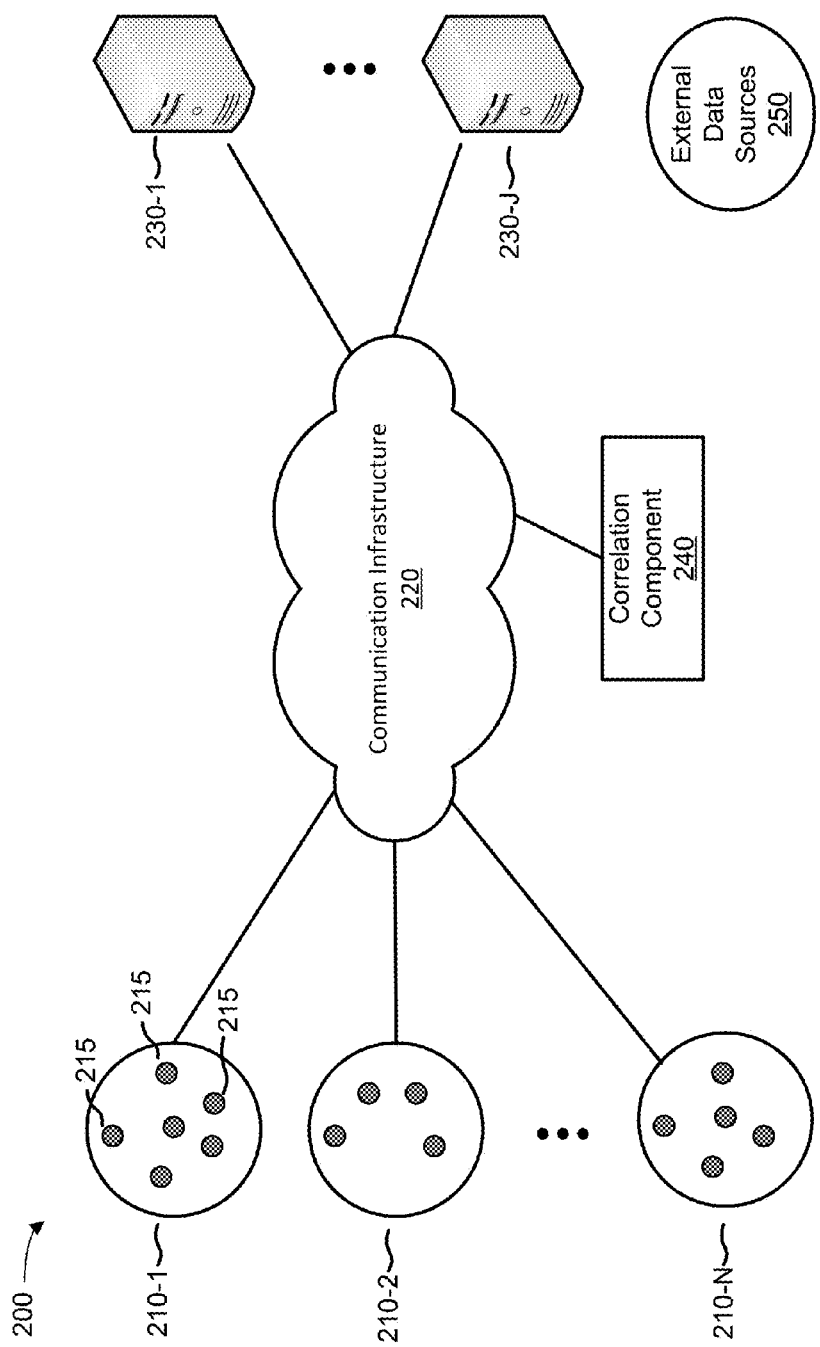
FIG. 2 is a diagram of an example environment in which systems and/or methods described herein may be implemented.

FIG. 2 is a diagram of an example environment 200, in which systems and/or methods described herein may be implemented. Environment 200 may generally include communication infrastructure that is used to couple one or more first computing devices to one or more second computing devices. A correlation protocol may be implemented with respect to the communication infrastructure. The correlation protocol may enable users of environment 200 (e.g., administrators/applications associated with the communication infrastructure or other users/applications that use the communication infrastructure) to obtain knowledge of the operation of the communication infrastructure with respect to communications, over the communication infrastructure, between the first and second computing devices.

In one implementation, the correlation protocol, as described herein, may be used in the context of communications with respect to M2M systems. The example of environment 200 will be particularly described in the context of M2M systems.

As illustrated, environment 200 may correspond to an environment in which one or more M2M networks are implemented. An M2M network may be defined as a number of M2M nodes that transmit data to one or more application servers.

A number of M2M networks 210-1 through 210-N (N>=1), which may be referred to collectively as M2M networks 210 or singularly as an M2M network 210, are illustrated in FIG. 2. Each M2M network 210 may include one or more nodes 215 (illustrated as a circle in FIG. 2). The nodes of a M2M network 210 may communicate, via communication infrastructure 220, with one or more application servers 230-1 through 230-J (J>=1), which may be referred to collectively as application servers 230 or singularly as an application server 230. Correlation component 240 may receive M2M data from nodes 215 and infrastructure data from communication infrastructure 220. Additionally, external data sources 250 may supply data to one or more of M2M networks 210, communication infrastructure 220, application servers 230, and/or correlation component 240.

Each node 215 may include a device that may implement one or more sensing components and a communication component. The sensing component may include, for example, a temperature sensor, a humidity sensor, a light sensor, a camera, a video camera, a geo-positioning element (e.g., a GPS component), and/or other sensors that generate or monitor data that relates to the environment of a particular node 215. The communication component may include a wireless or wired communication circuit that allows node 215 to transmit sensed data to another node and/or to communication infrastructure 220. For example, the communication component may include a cellular radio, a short range radio, circuitry to communicate over a wired link, or another communication technology.

As one example of an implementation of environment 200, M2M network 210-1 may correspond to an agriculture-based M2M network that monitors environmental conditions for a fruit farm and, M2M network 210-2 may correspond to M2M network that monitors inventory for a retailer, and M2M network 212-N may correspond to a healthcare-based M2M network that monitors the status of equipment in a hospital.

Nodes 215 are frequently implemented as relatively small and portable electronic devices, and may be plugged in to a power outlet or powered based on battery power and/or solar power. For example, for an agricultural M2M network, numerous nodes 215 may be arranged in agricultural land (e.g., a vegetable field, grain field, orchard, etc.) to provide information relevant to a farmer (e.g., soil moisture readings, temperature readings, etc.). Each node 215 in such a network may be a relatively small and inexpensive device and may be powered by a battery designed to last through a single growing season. Each node 215, in an M2M network 210, may communicate directly with communication infrastructure 220 (e.g., authentication infrastructure 220 may include a wireless cellular network and each node 215 may include a radio circuitry 215 for communicating with the cellular network). Alternatively, or additionally, one or more nodes 215, of a particular M2M network 210, may be designated as relay nodes that communicate with communication infrastructure 220. Other nodes in the particular M2M network 210 may transmit their sensed data to the relay nodes, which may forward the data through communication infrastructure 220 (e.g., periodically, and/or on another basis, such as when network bandwidth is available).

Communication infrastructure component 220 may include one or more networks that act to connect M2M networks 210 to application servers 230. The networks may include, for example, one or more networks of any type, such as a local area network (LAN), a wide area network (WAN), a metropolitan area network (MAN), and/or another type of network. In some implementations, the networks may include packet-based Internet Protocol (IP) networks. In one implementation, communication infrastructure 220 may include a cellular network, such as a long term evolution (LTE) based wireless network.

Application servers 230 may include one or more computing devices designed to receive data from M2M networks 210, process and/or aggregate the data, and present the data, via a graphical user interface, to one or more users associated with M2M networks 210. In some implementations, based on the received data, application servers 230 may automatically control one or more other devices, such as devices associated with a manufacturing process or agricultural process. Alternatively, or additionally, application servers 230 may provide analytic services through which users of application server 230 may monitor and/or evaluate M2M system 210. In one implementation, each application server 230 may correspond to a single M2M system 210. Thus, for example, users of a particular agricultural-based M2M network may interact with a first application server 230, users of a particular healthcare-based M2M network may interact with a second application server 230, etc.

Correlation component 240 may correlate infrastructure data, from communication infrastructure 220, to M2M data from nodes 215. Correlation component 240 may provide the information, determined based on the correlation, to application servers 230, which may, in turn present the information to one or more users. Alternatively or additionally, correlation component 240 may act on the information, such as by controlling communication infrastructure 220 and/or nodes 215. The operation of correlation component 240 will be particularly described in more detail below. Although described as a "component," M2M infrastructure server may include any number of distributed or co-located devices and/or applications that are used to implement the functionality, described herein, for correlation component 240. For example, correlation component 240 be implemented in a distributed manner, and may include a combination of routers, switches, packet data switching nodes (PDSNs), a network management platform (e.g., one or more servers), etc.

External data sources 250 may include any external data sources, such as commercial data providers or other sources of data, which may include any external information that is used in the operation of M2M application server/software applications 230 and/or correlation component 240, or that may assist in the generation of structured correlation data. Correlation component 240 may be implemented as part of communication infrastructure 220 or separate from communication infrastructure 220 (e.g., by a third party relative to a service provider that controls communication infrastructure 220).

Although FIG. 2 illustrates example components of an environment 200, in other implementations, environment 200 may contain fewer components, different components, differently arranged components, or additional components than those depicted in FIG. 2. Alternatively, or additionally, one or more components of environment 200 may perform one or more other tasks described as being performed by one or more other components of environment 200.

Figure 3:
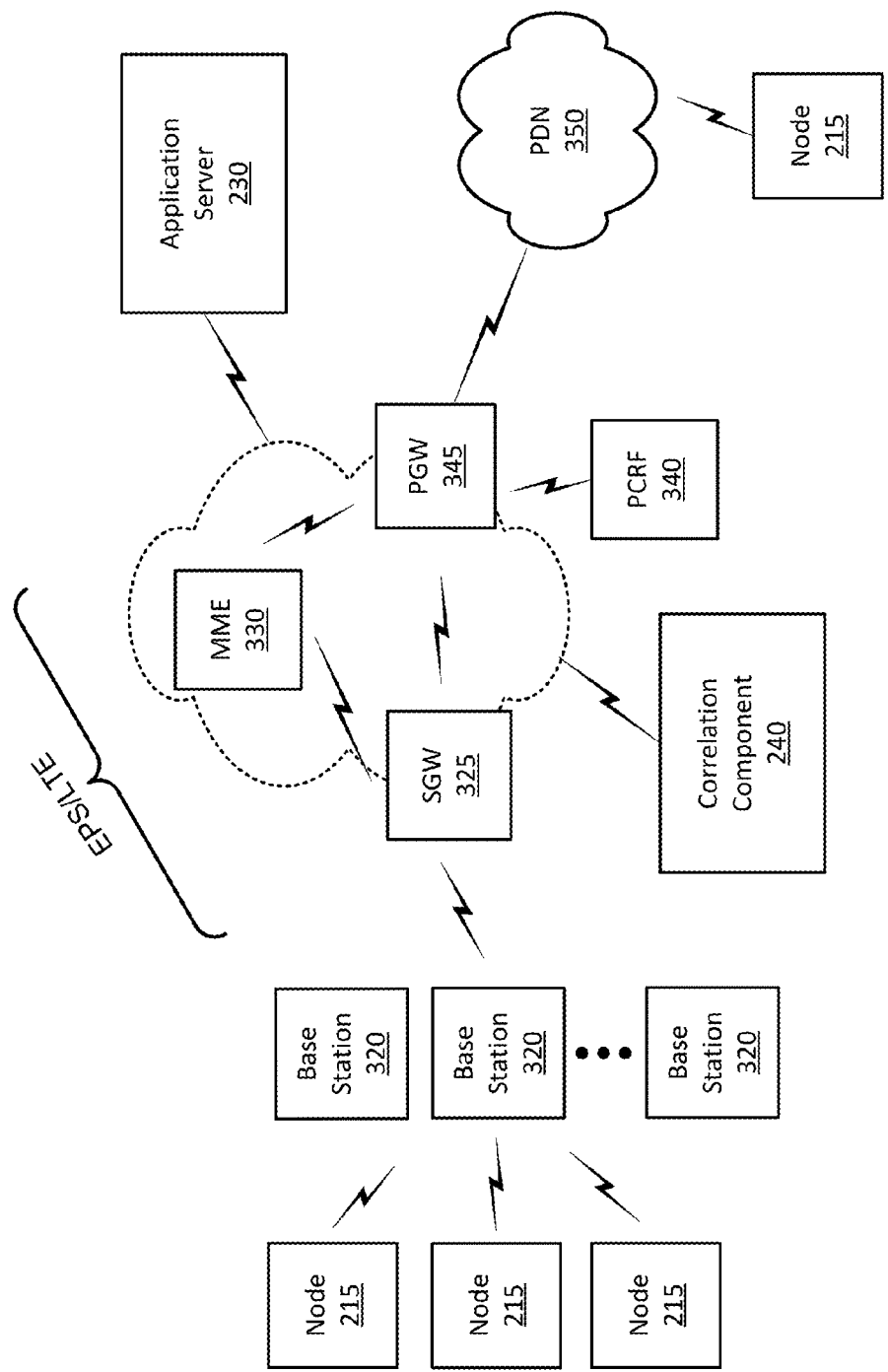
FIG. 3 is a diagram illustrating on example implementation of the environment shown in FIG. 2.

FIG. 3 is a diagram illustrating, in additional detail, one particular implementation of environment 200. In FIG. 3, the communication infrastructure may include a wireless cellular network, such as an evolved packet system (EPS) that includes a long term evolution (LTE) network based on a third generation partnership project (3GPP) wireless communication standard.

As shown in FIG. 3, nodes 215 may connect to base stations 320 and/or to a packet data network (PDN) 350. In an LTE environment, base stations 320 may take the form of evolved node Bs (eNodeBs). The environment of FIG. 3 may further include serving gateway (SGW) 325, mobility management entity (MME) 330, packet data network gateway (PGW) 345, policy charging and rules function (PCRF) 340. Application server 230 and correlation component 240 may connect through PDN 350 and/or the EPS/LTE network.

Base stations 320 may include one or more network devices that receive, process, and/or transmit traffic, such as calls, audio, video, text, and/or other data, destined for and/or received from mobile device 205. Base stations 320 and nodes 215 may communicate over radio interfaces to form a radio access network (RAN). Base stations 320 may receive traffic from and/or send traffic to PDN 345 via SGW 325 and PGW 345.

Base stations 320 may be physically located to provide cellular coverage to nodes 215, such that a node 215 may seamlessly move out of range of one base station 320 and into range of another base station 320. Each base station 320 may simultaneously provide radio connectivity to multiple nodes 215.

SGW 325 may include one or more computation and communication devices that route and forward user data packets. SGW 325 may route and forward user packets and also act as a mobility anchor during inter-base station handoffs.

MME 330 may include one or more computation and communication devices that perform signaling in environment 200. MME 330 may, for example, be responsible for authenticating nodes 215, maintaining location information for nodes 215, and selecting a PGW 345 to service a particular node 215. MME 330 may also operate to establish bearer channels associated with a session with node 215, to hand off node 215 from the EPS to another network, to hand off node 215 from the other network to the EPS, and/or to perform other operations. MME 330 may perform policing operations on traffic destined for and/or received from node 215.

PCRF 340 may include one or more server devices, or other types of devices, that aggregate information to and from the EPS network and/or other sources. PCRF 340 may receive information regarding policies and/or subscriptions from one or more sources, such as subscriber databases and/or from one or more users (such as, for example, an administrator associated with PCRF 340).

PGW 345 may include one or more network devices, or other types of computation and communication devices, that gather, process, search, store, and/or provide information in a manner described herein. For instance, PGW 345 may aggregate traffic received from one or more SGWs 325 and may send the aggregated traffic to PDN 350 and/or to another network. PGW 345 may also, or alternatively, receive traffic from PDN 350 and/or another network, and may send the traffic toward node 215 via SGW 325 and/or base station 320.

PDN 350 may include one or more wired and/or wireless networks. For example, PDN 350 may include an IP-based PDN. PDN 345 may include, for example, a WAN such as the Internet, and/or one or more other networks. Nodes 215 may connect, through PGW 345, to data servers, application servers, or to other servers/applications that are coupled to PDN 350.

The quantity of devices and/or networks, illustrated in FIG. 3, is provided for explanatory purposes only. In practice, there may be additional devices and/or networks; fewer devices and/or networks; different devices and/or networks; or differently arranged devices and/or networks than illustrated in FIG. 3. Alternatively, or additionally, one or more of the devices, shown in FIG. 3, may perform one or more functions described as being performed by another one or more of the devices of FIG. 3.

Figure 4:
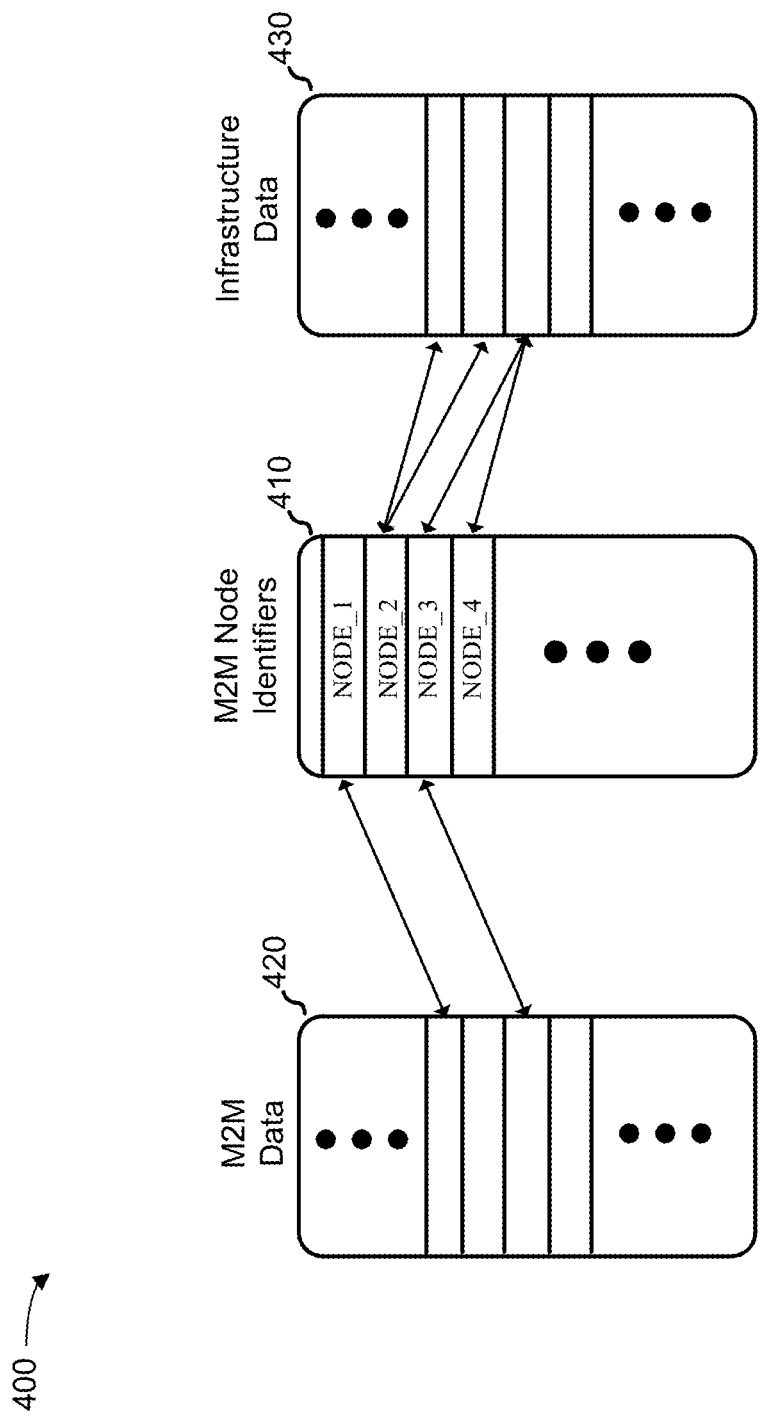
FIG. 4 is a diagram illustrating an example data structure which may be maintained by a correlation component.

FIG. 4 illustrates an overview of an example data structure 400 which may be maintained by correlation component 240. As previously mentioned, correlation component 240 may receive data from communication infrastructure 220, from the nodes within M2M networks 210, and from external sources 250. Correlation component 240 may correlate the received M2M data (i.e., the data from M2M systems 210) with the infrastructure data, in order to provide infrastructure-based insight into received M2M data.

In one implementation, data structure 400 may be implemented, by correlation component 240, as a relational database. In general, a relational database may include a database that has a collection of tables of data items which may be formally described and organized according to the relational model. In a relational database, each table schema may identify a primary column used for identifying a row called the primary key. Tables may be related to one another by using a foreign key, in one table, that points to the primary key, in another table.

As illustrated in FIG. 4, data structure 400 may conceptually include three sections, which, in the context of a relational database, may be implemented, for example, as three tables. The three tables may include: M2M node identifier table 410, M2M data table 420, and infrastructure data table 430.

M2M node identifier table 410 may store information used to identify nodes 215 of M2M systems 210. In some implementations, instead of identifying M2M data at the node level, M2M node identifier table 410 may store information identifying M2M systems 210. Nodes 215 may be identified by, for example, the IP address of the node, a mobile device serial number (for nodes that connect through a wireless network), a telephone number associated with the node (for nodes that connect through a wireless network), or another identifier assigned by the operator of communication infrastructure 220 and/or the operator of a particular M2M system 210.

In one implementation, when a node 215 or M2M system 210 initially begins to use, or registers with, correlation component 240, correlation component 240 may write an entry that identifies the node 215 or the M2M system 210, to M2M node identifier table 410. For example, when a node 215, associated with a mobile telephone number, first transmits M2M data to M2M infrastructure component 240, node 215 may register with correlation component 240 and, in response, correlation component 240 may write the mobile telephone number to M2M nodes identifier table 410.

M2M data table 420 may store the M2M data generated by nodes 215. As previously mentioned, M2M data may generally include data sensed, or otherwise generated, by nodes 215. The values in M2M data table 420 may thus include, for example, values representing temperature, humidity, light intensity, images, video, geo-positioning data, or other information. Each entry in M2M data table 420 may be associated with a foreign key that points back to M2M node identifier table 410 (e.g., a foreign key may be the identifier for a particular node 215, as stored in M2M node identifier table 410). In this manner, this foreign key may indicate from which node 215 the data, stored in a particular entry of table 420, was received. In some implementations, entries in M2M data table 420 may be associated with additional information, such as a timestamp value indicating when the M2M data was received by correlation component 240.

Infrastructure data table 430 may include data relating to the state of communication infrastructure 220. The data stored in infrastructure data table 430 may be stored in a way that associates particular items of infrastructure data to those of nodes 215 to which the particular items of infrastructure data are relevant. For example, the infrastructure data may include values describing the congestion level, over time, at a particular base station 320. This infrastructure dated may be particularly relevant to nodes 215 that connect through a particular base station 320. Infrastructure data table 430 may also include correspondences between particular infrastructure elements (e.g., routers, base stations, network links) and the nodes 215 to which the infrastructure elements are relevant. For example, when a node newly attaches to a particular base station 320, infrastructure data table 430 may be updated to include information indicate the attachment of the node to the base station. As is also illustrated in FIG. 4, some entries in infrastructure data table 430 may correspond to multiple nodes (e.g., a link congestion level value may be relevant to multiple nodes) and a single node may be associated with multiple entries in infrastructure data table 430.

In general, the infrastructure data, stored by infrastructure data table 430, may relate to any information, obtainable from communication infrastructure 220, that may be relevant to the connectivity of nodes 215 to application servers 230. Non-limiting examples of the type of information that may be defined by the infrastructure data include: (1) the operational state of network elements (e.g., whether a particular routers, switches, base stations are online or offline, etc.); (2) congestion levels at various links in communication structure 220; (3) congestion levels for radio links (e.g., radio links between nodes 215 and base stations 320); (4) signal strength at nodes 215; (5) and/or an indication of the amount of operational redundancy of the various network elements communication infrastructure 220 (e.g., the number of backup links or the number of backup routers corresponding to a particular portion of communication infrastructure 220). In one implementation, infrastructure data may be obtained from network elements in communication structure 220. Alternatively or additionally, the M2M data transmitted by nodes 215 may be augmented to include data that is measured by nodes 215, such as an indication of the radio signal strength received by a node 215, battery level of the node 215, or other information that may be determined by node 215 and that may be that may be relevant to the connectivity of node 215 to an application server 230.

In some implementations, the M2M data and the infrastructure data may be received, from M2M nodes 215 and from communication infrastructure 220, using one or more protocols, called correlation protocols herein, that may define formatting, reporting, and/or other features relating to the structure of the received information. The correlation protocol may exist and function alongside existing status communication protocols, such as SNMP (Simple Network Management Protocol), or the correlation protocol may serve as the primary means for communicating and controlling status messages. By requiring data from M2M nodes 215 and from communication infrastructure 220 to conform to the correlation protocol, correlation component 240 may be able to efficiently and effectively process and use the information received from M2M nodes 215, communication infrastructure 220, and/or external sources 250. As an example of the operation of the correlation protocol, the correlation protocol may specify specific data formats, specific values that should be included with the received correlation information (e.g., a timestamp value), and/or specific categories or tags that should be associated with information received from M2M nodes 215 and/or communication infrastructure 220. For instance, items of data received from M2M nodes 215 may be explicitly identified, by the transmitting M2M node 215, with a specific data type, such as a type field indicating that a particular data item is a temperature value, humidity value, soil moisture value, altitude value, velocity value, etc. Similarly, items of data received from communication infrastructure 220 may be explicitly identified with a specific infrastructure data type, such as a type field indicating that the data item defines a particular router performance metric, defines a particular radio interface performance metric, defines a particular network quality of service metric, etc. As another example, data items received from M2M nodes 215 and communication infrastructure 220 may each be associated with a field identifying the role of the network element that generated the data item (e.g., a router, firewall, M2M node, etc.).

Figure 5A:
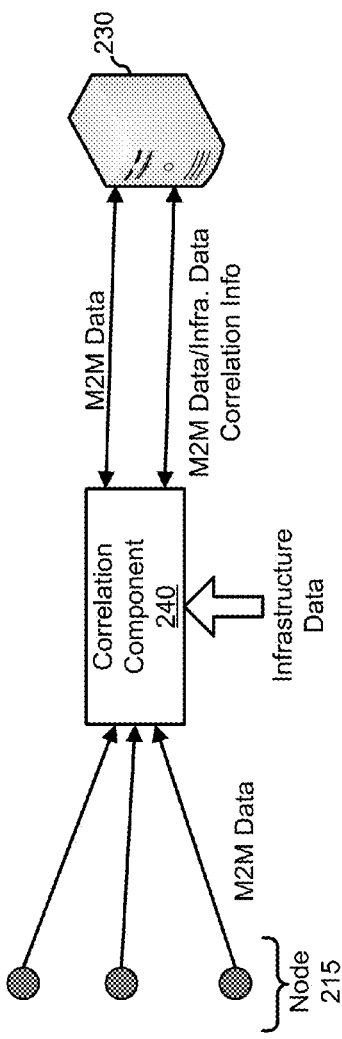
FIGS. 5A and 5B are diagrams illustrating example implementations of network architectures used to connect a correlation component.
Figure 5B:
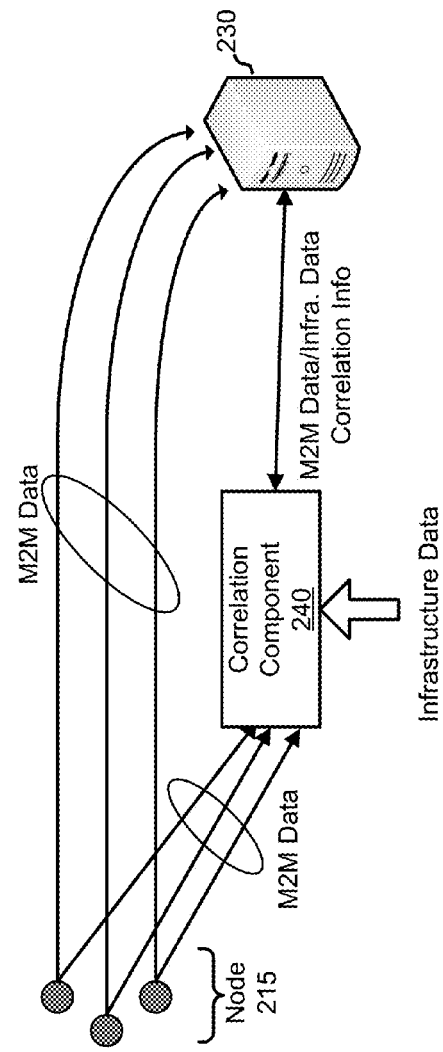

A number of different techniques may be used to operatively connect correlation component 240 to the M2M data, application server 230, and external source 250. FIGS. 5A and 5B illustrate example network architectures used to operatively connect correlation e component 240 to the M2M data, application server 230, and/or external source 250.

As illustrated in FIG. 5A, M2M data, from nodes 215, may be transmitted to correlation component 240, which may then make the M2M data available to application server 230. For example, the operator of correlation component 240 may make available an application programming interface (API) to the operators of M2M systems 210. The API may include specific formats and/or protocols that indicate how nodes 215 are to initially register with correlation component 240 and acceptable formats for M2M data received at correlation component 240. As is further illustrated in FIG. 5, application server 230 may query correlation component 240 to obtain the M2M data as well as to obtain information relating to the correlation between the M2M data and the infrastructure data (M2M data/infrastructure data correlation information). For example, with respect to the M2M data, application server 230 may subscribe or register to receive a particular subset of the M2M data in which application server 230 is interested. Similarly, application server 230 (or an operator of application server 230) may determine to examine the information relating to the correlation between the M2M data on the infrastructure data, application server 230 may similarly query correlation component 240 to obtain this information.

FIG. 5B is a diagram illustrating another possible implementation of a technique by which correlation component 240 may receive M2M data and infrastructure data. As illustrated, M2M data, from nodes 215, may be directly transmitted to both correlation component 240 and to application server 230. In this manner, application server 230 may directly obtain and use the M2M data, and correlation component 240 may receive the M2M data for purposes of correlating the M2M data to the infrastructure data. Application server 230 may still, however, query correlation component 240 to obtain the information relating to the correlation between the M2M data and the infrastructure data. In some situations, the technique shown in FIG. 5B may be used when a M2M node obtains network connectivity through a network service provider that is not associated with or that does not provide data to correlation component 240. Thus, in this situation, some or all of the M2M data would still be transmitted through network infrastructure, although potentially not through network infrastructure that provides infrastructure data to correlation component 240.

Figure 6:
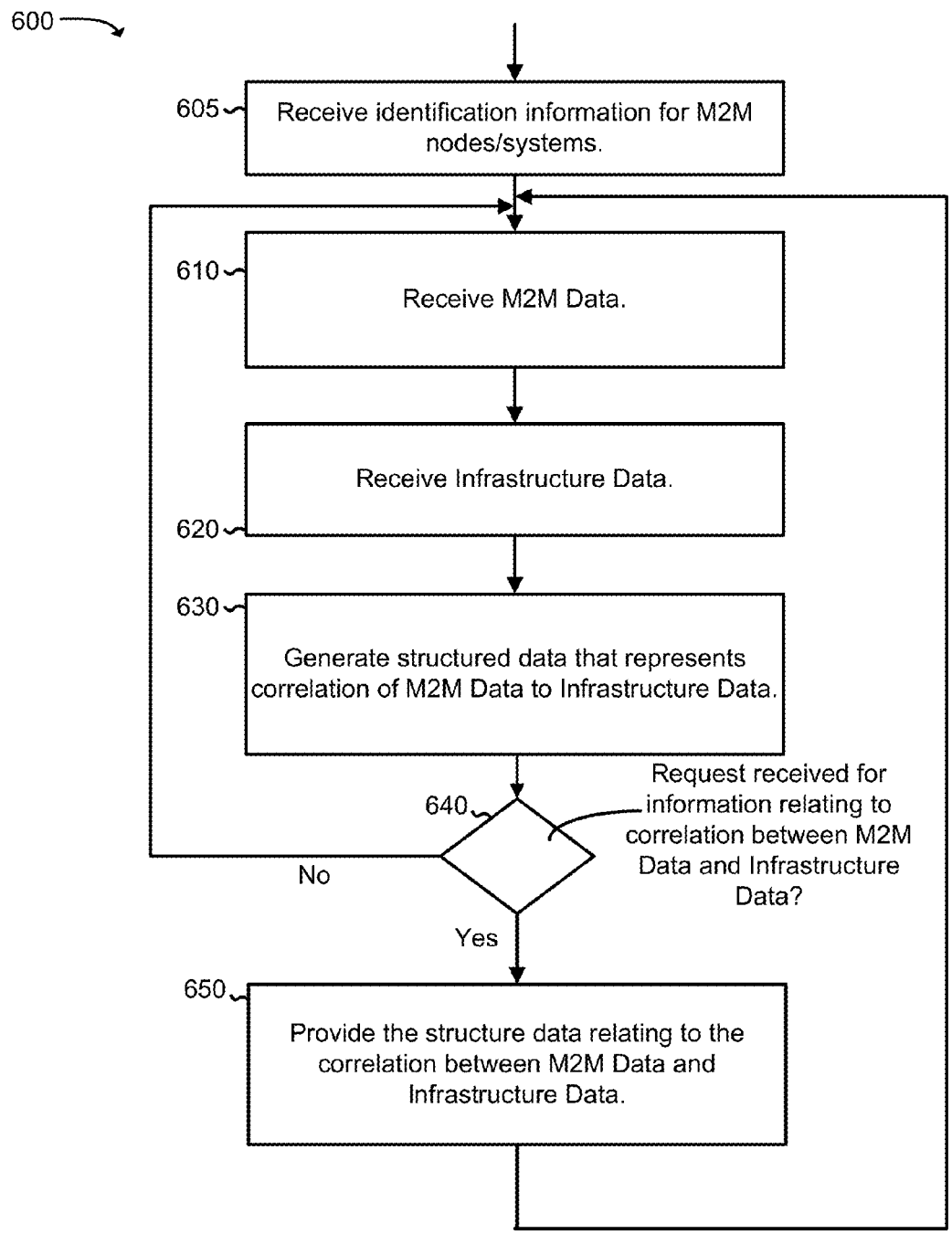
FIG. 6 is a flow chart illustrating an example process relating to the correlation of M2M data with infrastructure data.

FIG. 6 is a flow chart illustrating an example process 600 relating to the correlation of M2M data with infrastructure data. Process 600 may be performed, for example, by correlation component 240.

Process 600 may include receiving identification information for the M2M nodes and/or systems (block 605). For example, nodes 215, may initially register with correlation component 240. The registration may include providing an identifier corresponding to each node (e.g., an IP address, cellular telephone number, etc.). Alternatively or additionally, the correlation between the M2M data and the infrastructure data, as described herein, may be performed on an M2M system basis. In this case, the identification information may be for a single M2M system 210 (e.g., a set of two or more M2M nodes 215). As previously mentioned, a correlation protocol may be used to coordinate and format the communications between correlation component 240, nodes 215, and communication infrastructure 220 as relevant correlation data is prepared and transmitted. The correlation protocol may specify protocols for registration of nodes 215 with infrastructure component 240 and correlation component 240.

Process 600 may include receiving M2M data (block 610). As mentioned previously, M2M data may be received, by correlation component 240, from nodes 215, corresponding to one or more M2M systems 210. Correlation component 240 may store the received M2M data along with an indication of the node 215 and/or M2M system 210 associated with the M2M data. In some implementations, correlation component 240 may store only an indication that data was received from a particular node 215 and may not necessarily store the actual M2M data that was sensed by the node 215. Different types of example M2M data, that may be received by correlation component 240, is described in more detail below with reference to FIG. 7.

Process 600 may further include receiving infrastructure data corresponding to communication infrastructure 220 (block 620). The infrastructure data may include data describing the operation of communication infrastructure 220. In one implementation, network elements in communication infrastructure 220 may be configured to push relevant infrastructure data to correlation component 240. Alternatively or additionally, correlation component 240 may query the network elements, of communication infrastructure structure 220, to obtain the infrastructure data.

The received M2M data (block 610) and the received infrastructure data (block 620) may be stored in a relational database that includes a data structure similar to that discussed above with respect to FIG. 4. The receiving of the M2M data and the infrastructure data may also include validating the received data, such as by checking the data for errors and compliance with the correlation protocol.

In some implementations, data, such as correlation data, may be feed back into system 200 to create a feedback loop. For example, substantive M2M data, generated by an M2M node, may be analyzed by an external device or service, potentially modified, and then reintroduced into system 200. Such a scenario may create a loop in which the data is retransmitted to the external device or service. In some implementations, the error checking performed in block 610 may include checking for and correcting unstable feedback loops. A feedback loop factor value may be assigned to correlation data and is to be defined in the correlation protocol. A feedback decay factor can define attributes of feedback that are acceptable, such as the passage of time, passage of distance, iterations of correlation data that contain some parts of repeated information. For example, Node 1 transmits temperature T at time 0h00m00s, 0h00m30s, 0h01m00s, . . . (every 30 seconds). Node 1 also transmits its location, but only once every 1 minute. So, the location data for temperature sample T would be the same at times 0h00m00s, 0h00m30s, as temperature samples T are taken. The function of feedback control within the correlation protocol would be to set acceptable thresholds for certain data sets. In this example, such measurements are acceptable. However, if data is coming from the sensor itself, and also coming from external subscription sources (e.g., external data from external source 250), and the same node N, with same temperature T measurements are received, the feedback loop correction function can manage such duplicates and parse/remove data in the correlation, as indicated by the correlation protocol. This may help to ensure that correlation data is not received and processed in such a way as to damage the value of data, and/or performance of the system.

Process 600 may further include generating structured data that represents the correlation of the received M2M data and infrastructure data (block 630). In one implementation, correlation component 240 may correlate the M2M data and the infrastructure data using the information received pursuant to the correlation protocol (e.g., timestamp values, data types for the data items received by M2M infrastructure component 240, information identifying device that generated a particular data item, etc.). As previously described, a relational database may be used, by the correlation component 240, to store the received M2M data and infrastructure data, and may be used to facilitate the generation of the structured data that represents the correlation of the M2M data and the infrastructure data.

In some implementations, when determining the correlation between the received M2M data and infrastructure data, models and/or other functions (e.g., externally supplied functions) may be used to intelligently determine which data items, associated with the infrastructure data, affect the M2M data.

Process 600 may further include receiving a request for the information relating to the correlation between the M2M data and the infrastructure data (block 640). For example, an operator of application server 230 may desire to analyze the performance and/or reliability of communication infrastructure 220 with respect to the transmission of the M2M data received by application server 230. Application server 230 may submit a request, such as a request formatted according to an API provided by the operator of correlation component 240. In one implementation, the request may include an indication of a time period that is of interest (e.g., a start time and an end time, a start time and a duration, an end time and a duration, etc.), particular values of M2M data that are of interest, and/or particular nodes 215 that are of interest. In some implementations, correlation component 240 may provide value added analysis features such as by providing summary information or charts (e.g., via a web interface) that provide a high-level view of the operation of communication infrastructure 220 with respect to the M2M data corresponding to application server 230.

In some implementations, the request received in block 640 may be a request that is stored by correlation component 240 and that may be used to generate automatic actions by correlation component 240. For example, correlation component 240 may store rules, that when triggered, cause actions to be taken with respect to nodes 215, communication infrastructure 220, and/or application servers 230. For example, a trigger may be activated when a certain network link is detected to be down, and may cause one or more affected nodes 215 to be notified and/or a user of an application server 230 to be notified. As another example, the trigger may cause a message to be sent to an external application that may in some way operate to control an M2M system 210.

Process 600 may further include providing, in response to the request, the requested information relating to the correlation between the M2M data and the infrastructure data (block 640—YES; block 650). As mentioned above, correlation component 240 may provide the information relating to the correlation between the M2M data and the infrastructure data via an API (e.g., programmatically), a web interface, or through another interface. In one implementation, correlation component 240 may obtain the requested information based on the structured correlation data that is generated in block 630. Further, as previously mentioned, the requested information may be automatically provided in response to a rule that is automatically triggered based on the received M2M data and infrastructure data.

Figure 7:
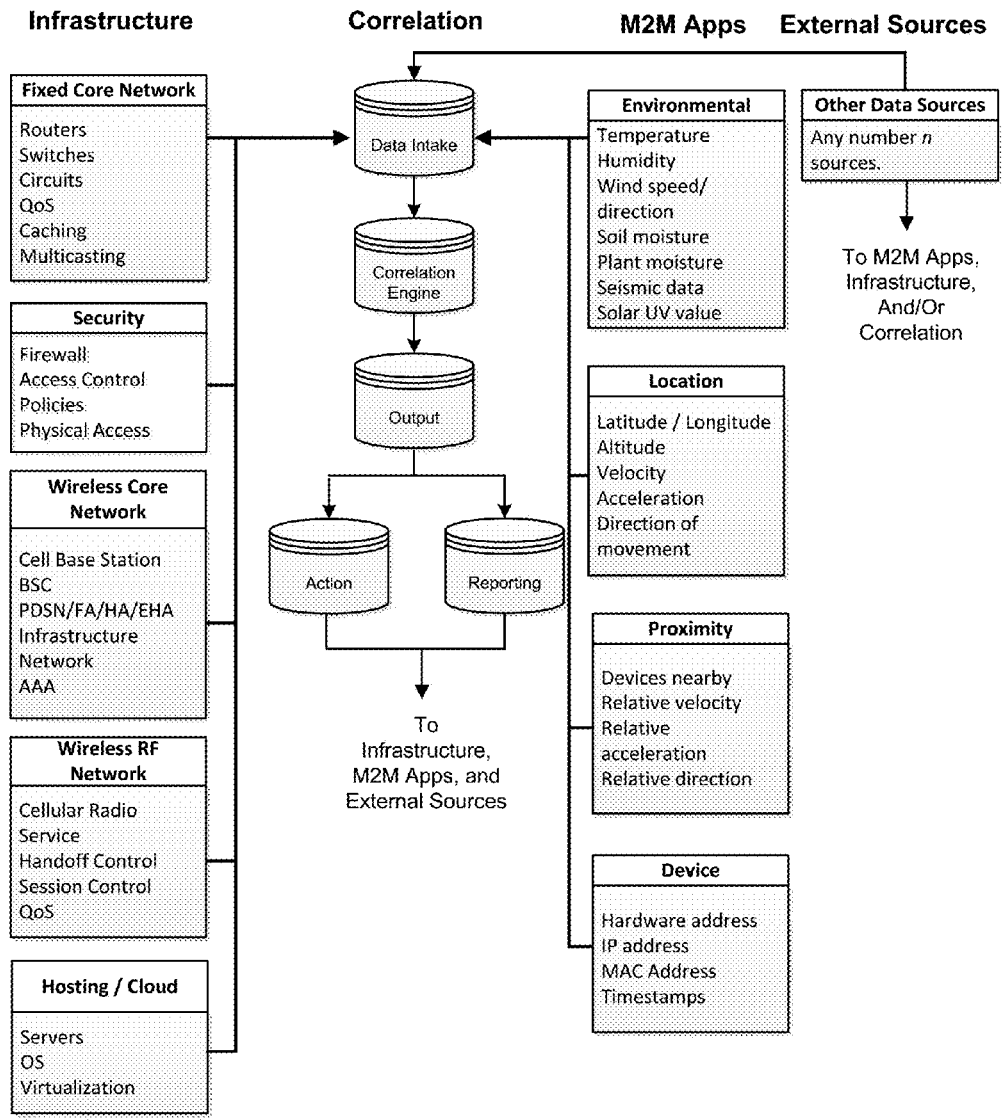
FIG. 7 is a diagram conceptually illustrating correlation of relevant sections within an M2M environment, including the association between infrastructure, M2M systems, external sources, and the correlation component.

FIG. 7 is a diagram conceptually illustrating the correlation of M2M data with infrastructure data consistent with aspects described herein. The concepts illustrated in FIG. 7 may generally correspond to the process shown in the flowchart of FIG. 6.

As illustrated in FIG. 7, concepts described herein may be conceptually divided into the categories: infrastructure, correlation, M2M applications (M2M apps), and external sources. The infrastructure category may refer to the various types of data items that may be received from communication infrastructure 220. The M2M applications category may refer to the various types of data items that may be received from nodes 215. Correlation category may refer to the operations, by correlation component 240, in generating and using the structured correlation data. The external sources category may refer to data generated by other entities, such as external/third party/commercial/private data providers, and may be useful to the operation of correlation component 240 in generating or using the structured correlation data. Note also that some correlation data may not be used in all cases, in which case the correlation protocol will manage policies regarding use. In some cases, for example, location data may need to be truncated to protect privacy. In that case, data sent to external sources, or otherwise acted upon, may require modification by correlation component 240.

Data in the infrastructure category may generally relate to communication infrastructure 220. As illustrated, infrastructure data may include data relating to categories such as fixed (e.g., wired) core network, security, a wireless core network, a wireless radio frequency (RF) network, and hosting/cloud components of communication infrastructure 220. As is further illustrated in FIG. 7, each category may include multiple sub-categories of data. The fixed core network category may include the sub-categories routers, switches, circuits, quality of service (QoS), caching, and multicasting. The security category may include the sub-categories firewall, access control, policies, and physical access. The wireless core network category may include the sub-categories cell base station, BSC, PDSN/FA/HA/EHA, infrastructure, network, and AAA. The wireless RF network category may include the sub-categories cellular radio, service, handoff control, session control, and QoS. The hosting/cloud category may include the sub-categories servers, OS, and virtualization.

Data in the M2M applications category may generally relate to the M2M data generated by nodes 215. As illustrated in FIG. 7, the M2M data may include data relating to categories such as environmental, location, proximity, and device. The environmental category may include the sub-categories temperature, humidity, wind speed/direction, soil moisture, plant moisture, seismic data, and solar UV data. The location category may include the sub-categories latitude/longitude, altitude, velocity, acceleration, and direction of movement. The proximity category may include the sub-categories devices nearby, relative velocity, relative acceleration, and relative direction. The device category may include the sub-categories hardware address, IP address, MAC address, and timestamps.

The correlation category, illustrated in FIG. 7, may include functional components relating to the process shown in FIG. 6. The functional components may generally include a data intake component (e.g., corresponding to the operations of blocks 610 and 620), correlation engine component (e.g., corresponding to the operation of block 630), and the components output, action, and reporting (e.g., corresponding to the operation of blocks 640 and 650).

As is further shown in FIG. 7, the M2M applications category, the infrastructure category, and/or the correlation category may also receive information, from the external sources category, which may include any external information that is used in the operation of M2M application servers 230 and/or correlation component 240, or that may assist in the generation of the structured correlation data. As an example, an external data provider may maintain data tracking soil moisture conditions around the country. The soil moisture data may be received by correlation component 240 and incorporated into structured correlation data, which may be used by M2M application servers without necessarily requiring an operator of the M2M application servers to need to incorporate soil moisture sensors in the nodes installed by the operator.

Figure 8:
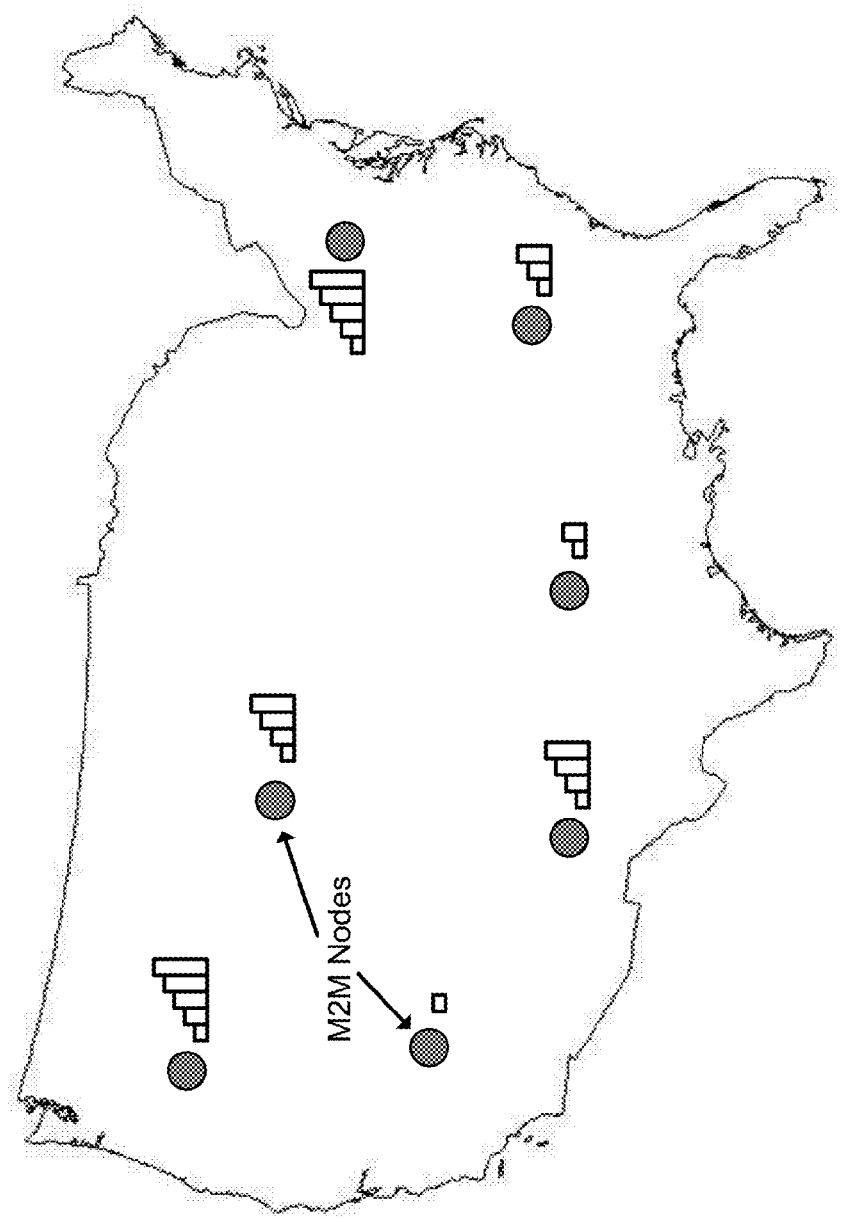
FIG. 8 is a diagram illustrating one particular example of providing information relating to the correlation between M2M data and infrastructure data.

FIG. 8 is a diagram illustrating one particular example of the providing of the information relating to the correlation between the M2M data and the infrastructure data. In this example, the information relating to the correlation between the M2M data and the infrastructure data may be provided to a user, in a graphical format, via a web interface. Assume that an operator is assigned to monitor a particular M2M system 210, in which each node 215 uploads its sensed data through a wireless interface, such as an interface to an EPS/LTE network. The nodes may be geographically distributed and may connect to different base stations in the communication infrastructure.

In this example, assume that correlation component 240 provides a graphical interface, such as a web interface, that provides various reports relating to M2M systems that are being monitored by correlation component 240. One such report may be a chart that presents a graphical view of the signal strength associated with nodes 215 and M2M system 210. As shown in FIG. 8, a map of the geographical area covered by nodes 215 (illustrated by circles in the map) may be displayed. Next to each node, a graphical indication of the current signal strength (or another metric, such as the average signal strength corresponding to the node over the last 24 hours) may be presented. In this example, the signal strength may be presented as a number of bars, in which one bar indicates a relatively weak signal and five bars indicate a relatively strong signal, and/or by colored icons. In this manner, an operator can quickly and efficiently view the status of the communication infrastructure relevant to the nodes, in an M2M system, that are relevant to the operator. The intent of FIG. 8 is to demonstrate one of any number of ways information developed from the correlation component 240 can be presented and used. The structured correlation data can also be used by any variety of applications to allow for graphical or analytical analysis and display of information and knowledge gained by correlation component 240.

As another example of correlation functionality between the M2M data and the infrastructure data by correlation component 240, consider M2M data that includes a temperature plot of data points sensed by one or more nodes 215. Correlation component 240 may provide information relating to the data points (e.g., from the structured correlation data that was determined by correlation component 240), such as the base stations 320 associated with the sensing nodes, network congestion at the base stations 320, signal-to-noise ratio of the radio interface corresponding to the base stations 320, etc.

As another example of the providing of correlation information between the M2M data and the infrastructure data, for a given set of M2M data, correlation component 240 may provide a set of key performance indicator (KPIs) that summarizes the strength or robustness of the M2M data. For example, for a user-defined set of M2M data, correlation component 240 may provide an average level of network congestion and wireless signal strength corresponding to the data points in the set of M2M data.

Figure 9:
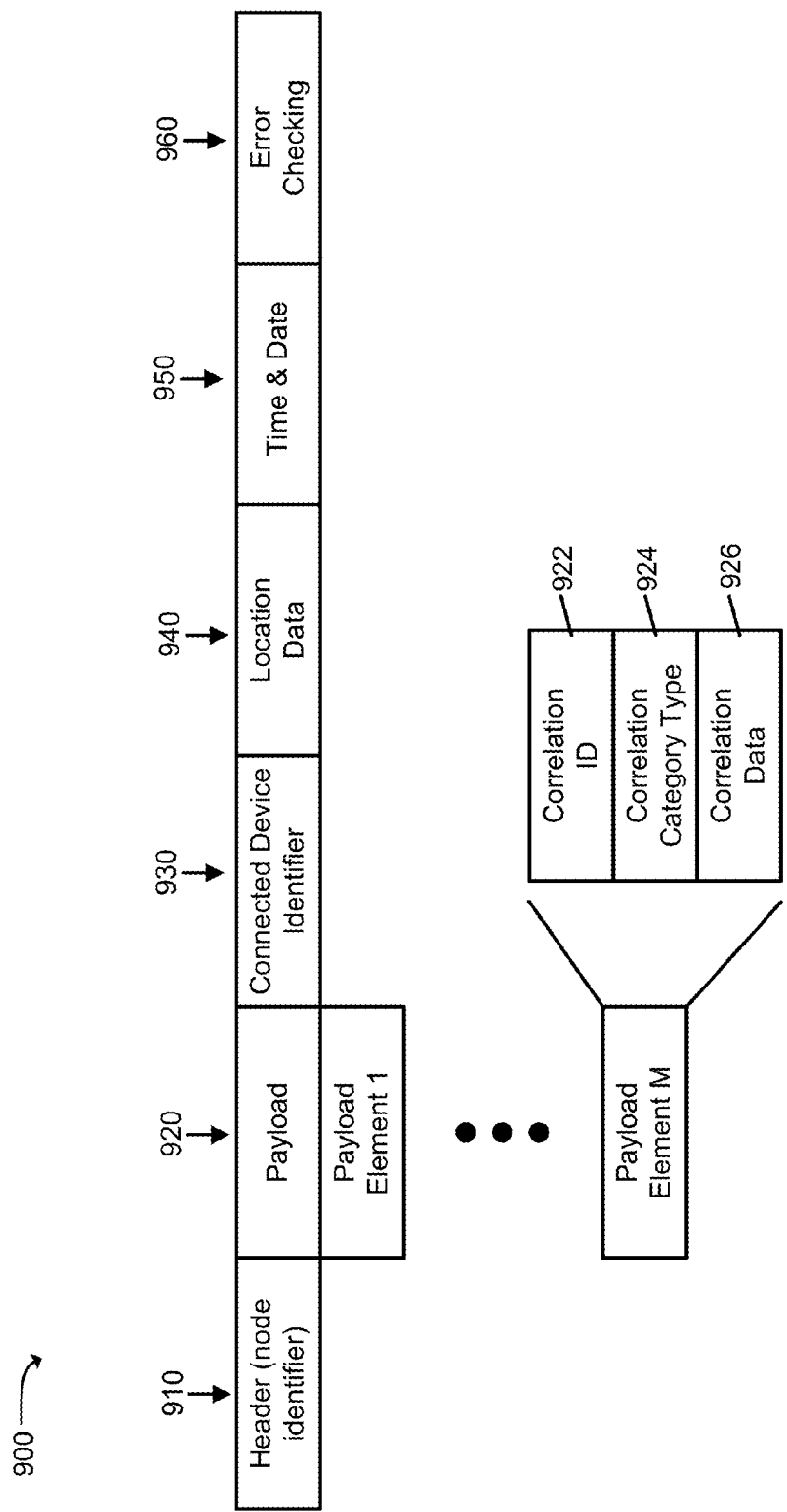
FIG. 9 is a diagram illustrating an example format of a message that may be exchanged between devices and constructed according to a correlation protocol.

FIG. 9 is a diagram illustrating an example format of a message 900 that may be constructed according to a correlation protocol. Message 900 may be used to transmit M2M data, infrastructure data, data from external sources, data from the Correlation Component 240, or other data. The format of message 900, as shown in FIG. 9, is an example. In other implementations, other formats or other arrangements may be used to exchange data in system 200. Native device messages may continue to function outside of the correlation protocol, but upon receipt and processing by correlation component 240, correlation component 240 may publish new data to other elements using the correlation protocol.

As illustrated, message 900 may include a number of sections or fields, including: header section 910, payload section(s) 920, connected device identifier 930, location data 940, time & data section 950, and error checking section 960.

Header section 910 may include data identifying the M2M node, infrastructure device, or other device, that produced message 900. The identification data may correspond to the identification information received in block 605 (FIG. 6).

Payload section(s) 920 may include one or more payload elements, illustrated in FIG. 9 as payload elements 1 through M. Each payload element may include the substantive data, as well as other data, that may be used by correlation component 240.

As an example, each payload section may include a number of sub-sections, illustrated as correlation ID 922, correlation category type 924, and correlation data 926. Correlation ID 922 may include a field or category value that specifies a source type associated with the substantive payload data (e.g., infrastructure data, M2M data, external data). Correlation category type 924 may include a field or category value that specifies a type of the substantive correlation data. For example, category type 924 may indicate that the substantive data is GPS location data, a temperature measurement, a network link latency value, etc. Correlation data 926 may include the substantive data (e.g., the actual GPS location data, the temperature reading, the network link latency value, etc.).

Connected device identifier 930 may include information identifying other devices that are directly connected to the device that generates message 900. Connected device identifier 930 may allow correlation component 240 to dynamically construct the topography of communication infrastructure 220 and/or M2M networks 210 without having to explicitly query the communication infrastructure and/or M2M networks.

Location data 940 may include information defining the geographical location of the device that generates message 900. Time & date section 950 may include a time and data stamp at which message 900 was generated. Error checking section 960 may include error checking information for message 900, such as check sum data, cyclic redundancy check (CRC) data, or other error checking information. In implementations in which data relating to correlation information may be re-circulated in system 200, potentially creating unstable feedback loops, error checking section 960 may include information to restrict the potential feedback loops (e.g., a feedback decay value, a loop counter).

FIG. 10 is a diagram of example components of device 1000. One or more of the devices illustrated in FIGS. 1-3, 5A, 5B, and 7 may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, a radio interface, or the like. Communication interface 1060 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 6, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method comprising:
receiving, by one or more devices, machine to machine (M2M) data that is generated by a plurality of M2M nodes, through communication infrastructure that operates to connect the M2M nodes to an application server associated with the M2M nodes;
receiving, by the one or more devices, infrastructure data relating to a state of the communication infrastructure during a time period when the M2M data is being communicated through the communication infrastructure;
generating, by the one or more devices, structured data that represents a correlation of the received data and the infrastructure data;
analyzing, by the one or more devices, the structured data to determine an action to take, relating to improving communication of the M2M data via the communication infrastructure; and
communicating, by the one or more devices, with one or more of the plurality of M2M nodes to perform the action to improve the communication of the M2M data.

2. The method of claim 1, further comprising:
determining that particular M2M data was lost during transmission through the communication infrastructure, wherein the communicating with one or more of the plurality of M2M nodes includes requesting, from the one or more of the plurality of M2M nodes, to retransmit the lost M2M data.

3. The method of claim 1, further comprising:
determining that a particular section of the communication infrastructure is unavailable, wherein the communicating with one or more of the plurality of M2M nodes includes instructing the one or more of the plurality of M2M nodes to delay sending the M2M data.

4. The method of claim 1, wherein the receiving of the M2M data includes receiving an indication that the M2M data was transmitted by particular nodes of the plurality of M2M nodes through the communication infrastructure.

5. The method of claim 1, wherein the received M2M data includes data that is measured by the plurality of M2M nodes and relates to connectivity of the plurality of M2M nodes to the communication infrastructure.

6. The method of claim 5, wherein the measured data includes:
an indication of a radio signal strength of a particular node of the plurality of M2M nodes; or
an indication of a battery level of the particular node of the plurality of M2M nodes.

7. The method of claim 1, wherein the structured data includes information relating to operation of the communication infrastructure in connecting the plurality of M2M nodes to the application server during the time period corresponding to the time period when the M2M data is communicated through the communication infrastructure.

8. The method of claim 1, further comprising:
receiving a request for information relating to the state of a portion of the communication infrastructure associated with the transmission of the M2M data by the plurality of the M2M nodes;
determining, based on the structured data, the requested information relating to the state of the portion of the communication infrastructure; and
outputting the requested information relating to the state of the portion of the communication infrastructure.

9. A device comprising:
a memory; and
at least one processor to execute instructions in the memory to:
receive machine to machine (M2M) data that is generated by a plurality of M2M nodes, through communication infrastructure that operates to connect the M2M nodes to an application server associated with the M2M nodes;
receive infrastructure data relating to a state of the communication infrastructure during a time period when the M2M data is being communicated through the communication infrastructure;
generate structured data that represents a correlation of the received data and the infrastructure data;
analyze the structured data to determine an action to take, to improve communication of the M2M data via the communication infrastructure; and
communicate with one or more of the plurality of M2M nodes to perform the action to improve the communication of the M2M data.

10. The device of claim 9, wherein the at least one processor is to further execute instructions in the memory to:
determine that particular M2M data was lost during transmission through the communication infrastructure, wherein the communicating with one or more of the plurality of M2M nodes includes requesting, from the one or more of the plurality of M2M nodes, to retransmit the lost M2M data.

11. The device of claim 9, wherein the at least one processor is to further execute instructions in the memory to:
determine that a particular section of the communication infrastructure is unavailable, wherein the communicating with one or more of the plurality of M2M nodes includes instructing the one or more of the plurality of M2M nodes to delay sending the M2M data.

12. The device of claim 9, wherein the receiving of the M2M data includes receiving an indication that the M2M data was transmitted, by particular nodes of the plurality of M2M nodes, through the communication infrastructure.

13. The device of claim 9, wherein the received M2M data includes data that is measured by the plurality of M2M nodes and relates to connectivity of the plurality of M2M nodes to the communication infrastructure.

14. The device of claim 13, wherein the measured M2M data includes:
an indication of a radio signal strength of a particular node of the plurality of M2M nodes; or
an indication of a battery level of the particular node of the plurality of M2M nodes.

15. The device of claim 9, wherein the structured data including information relating to operation of the communication infrastructure in connecting the plurality of M2M nodes to the application server during the time period when the M2M data was communicated through the communication infrastructure.

16. The device of claim 9, wherein the at least one processor is to further execute the instructions in the memory to:
receive a request for information relating to the state of a portion of the communication infrastructure associated with the transmission of the M2M data by the plurality of the M2M nodes;
determine the requested information relating to the state of the portion of the communication infrastructure; and
output the requested information relating to the state of the portion of the communication infrastructure.

17. A server device comprising:
a memory; and
at least one processor to execute instructions in the memory to:
receive indications of when machine to machine (M2M) data was communicated, by M2M nodes, of a plurality of M2M nodes, through communication infrastructure that operates to connect the M2M nodes to an application server associated with the M2M nodes;
receive infrastructure data relating to a state of the communication infrastructure during a time period during when the M2M data is being communicated through the communication infrastructure;
determine structured data that represents a correlation of the received data and the infrastructure data;
determine when M2M data is lost in transmission through the communication infrastructure and to the application server;
analyze the structured data to determine an action to take relating to the lost M2M data; and
transmit instructions, to one or more devices associated with the communication infrastructure or to one or more of the M2M nodes, to facilitate the transmission of the lost data to the application server.

18. The server of claim 17, wherein the received M2M data includes data that is measured by the plurality of M2M nodes and relates to connectivity of the plurality of M2M nodes to the communication infrastructure.

19. The server of claim 18, wherein the measured M2M data includes:
an indication of a radio signal strength of a particular node of the plurality of M2M nodes; or an indication of a battery level of the particular node of the plurality of M2M nodes.

20. The server of claim 17, wherein the structured data includes information relating to operation of the communication infrastructure in connecting the M2M nodes to the application server during the time period corresponding to the time period when the M2M data was communicated through the communication infrastructure.

* * * * *